United States Patent
Lemay et al.

(10) Patent No.: US 9,213,583 B2
(45) Date of Patent: *Dec. 15, 2015

(54) RELOCATING RELATED RESOURCE PARTITIONS

(75) Inventors: Monica J. Lemay, Cedar Park, TX (US); Purushothama Padmanabha, Bangalore (IN); Yogesh G. Patgar, Bangalore (IN); Shashidhar Soppin, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 621 days.

This patent is subject to a terminal disclaimer.

(21) Appl. No.: 13/570,147

(22) Filed: Aug. 8, 2012

(65) Prior Publication Data

US 2013/0179882 A1 Jul. 11, 2013

Related U.S. Application Data

(63) Continuation of application No. 13/345,381, filed on Jan. 6, 2012.

(51) Int. Cl.
*G06F 12/02* (2006.01)
*G06F 9/50* (2006.01)

(52) U.S. Cl.
CPC .............. *G06F 9/5077* (2013.01); *G06F 12/02* (2013.01)

(58) Field of Classification Search
CPC ........................................................ G06F 12/02
USPC ........................................................ 711/165
See application file for complete search history.

(56) References Cited

U.S. PATENT DOCUMENTS

2005/0268298 A1* 12/2005 Hunt et al. ......................... 718/1
2007/0220121 A1 9/2007 Suwarna (Continued)

FOREIGN PATENT DOCUMENTS

EP 2053509 A2 4/2009

OTHER PUBLICATIONS

Anonymous; Management Framework for Efficient Live Migration of Virtual Machines Running Migration-Aware Applications; IPCOM000200260D Ip.com, Oct. 3, 2010.

(Continued)

*Primary Examiner* — Sanjiv Shah
*Assistant Examiner* — Gautam Sain
(74) *Attorney, Agent, or Firm* — Kunzler Law Group; Onmion Josephs

(57) ABSTRACT

An apparatus for relocating related resource partitions includes a detection module that detects a relocation event to relocate a first resource partition operating in a first division from the first division to a second division. The first division includes a second resource partition. The first resource partition and the second resource partition are each distinct operating environments. A determination module determines that the second resource partition is sufficiently related to the first resource partition. A relocation module relocates the second resource partition to the second division with the first resource partition in response to determining that the second resource partition is sufficiently related to the first resource partition.

6 Claims, 10 Drawing Sheets

(56) References Cited

U.S. PATENT DOCUMENTS

| | | |
|---|---|---|
| 2009/0089781 A1 | 4/2009 | Shingai et al. |
| 2009/0276783 A1 | 11/2009 | Johnson et al. |
| 2010/0030877 A1 | 2/2010 | Yanagisawa |
| 2010/0229175 A1 | 9/2010 | Gonzalez, Jr. et al. |
| 2011/0004735 A1 | 1/2011 | Arroyo et al. |
| 2011/0153971 A1* | 6/2011 | O'Neill et al. ........ 711/165 |
| 2012/0096460 A1* | 4/2012 | Sekiguchi et al. ........ 718/1 |
| 2012/0102190 A1 | 4/2012 | Durham et al. |
| 2013/0166749 A1 | 6/2013 | Kruglick |

OTHER PUBLICATIONS

U.S Appl. No. 13/345,381, Final Office Action, Mailed: May 23, 2014.
U.S. Appl. No. 13/345,381, Office Action, Nov. 21, 2013.
GB1222232.9, Combined Search and Examination Repost under Sections 17 and 18(3), Jun. 21, 2013.
U.S. Appl. No. 13/345,381, Office Action, Mailed: Sep. 11, 2014.

* cited by examiner

RELOCATING RELATED RESOURCE PARTITIONS

CROSS-REFERENCE TO RELATED APPLICATIONS

This is a continuation application of and claims priority to U.S. patent application Ser. No. 13/345,381 entitled "RELOCATING RELATED RESOURCE PARTITION" and filed on Jan. 6, 2012 for Monica J. Lemay, which is incorporated herein by reference.

BACKGROUND

1. Field

The subject matter disclosed herein relates to resource partitions in a virtualized computing environment and more particularly relates to relocating related resource partitions.

2. Description of the Related Art

Hardware and software virtualization enables the abstraction of a computing platform and/or an operating system to simulate computer environments in which applications, programs, and operating systems may execute. Typically, an application on a computing platform, such as a hypervisor, manages and/or provides these virtual environments, or resource partitions (partitions of the computing platform's resources).

Many virtualization systems provide resource partition mobility—the ability to relocate a resource partition from one division (such as a computer system) to another division to balance workloads, free up resources on a computer system, and the like. Often, resource partitions communicate with other resource partitions in the same or different division. Therefore, relocating a particular resource partition may affect communication traffic with the particular resource partition and other resource partitions.

BRIEF SUMMARY

One embodiment of a method for relocating related resource partitions is provided. The method includes detecting a relocation event to relocate a first resource partition operating in a first division from the first division to a second division. The first division includes a second resource partition. The first resource partition and the second resource partition are each distinct operating environments. The method also includes determining that the second resource partition is sufficiently related to the first resource partition. The method includes relocating the second resource partition to the second division with the first resource partition in response to determining that the second resource partition is sufficiently related to the first resource partition.

One embodiment of an apparatus for relocating related resource partitions is provided with a plurality of modules configured to functionally execute the steps described above with regard to the presented method. These modules, in the described embodiments, include a detection module, a determination module, and a relocation module. The detection module detects a relocation event to relocate a first resource partition operating in a first division from the first division to a second division. The first division includes a second resource partition and the first resource partition and the second resource partition are each distinct operating environments. The determination module determines that the second resource partition is sufficiently related to the first resource partition. The relocation module relocates the second resource partition to the second division with the first resource partition in response to the determination module determining that the second resource partition is sufficiently related to the first resource partition.

One embodiment of a system is presented for relocating related resource partitions. The system includes a processor, a memory in communication with the processor, an operating system kernel, and a partition relocation apparatus stored on the memory and executed by the processor. The partition relocation apparatus is in communication with the operating system kernel. The partition relocation apparatus includes a detection module, a determination module, and a relocation module. The detection module detects a relocation event to relocate a first resource partition operating in a first division from the first division to a second division. The first division includes a second resource partition and the first resource partition and the second resource partition are each distinct operating environments. The determination module determines that the second resource partition is sufficiently related to the first resource partition. The relocation module relocates the second resource partition to the second division with the first resource partition in response to the determination module determining that the second resource partition is sufficiently related to the first resource partition.

Another embodiment of a method is presented that includes deploying a partition relocation apparatus onto a computing system. The partition relocation apparatus is capable of detecting a relocation event to relocate a first resource partition operating in a first division from the first division to a second division. The first division includes a second resource partition. The first resource partition and the second resource partition are each distinct operating environments. The partition relocation apparatus is also capable of determining that the second resource partition is sufficiently related to the first resource partition. The partition relocation apparatus is also capable of relocating the second resource partition to the second division with the first resource partition in response to determining that the second resource partition is sufficiently related to the first resource partition.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION OF THE INVENTION

Figure 1:
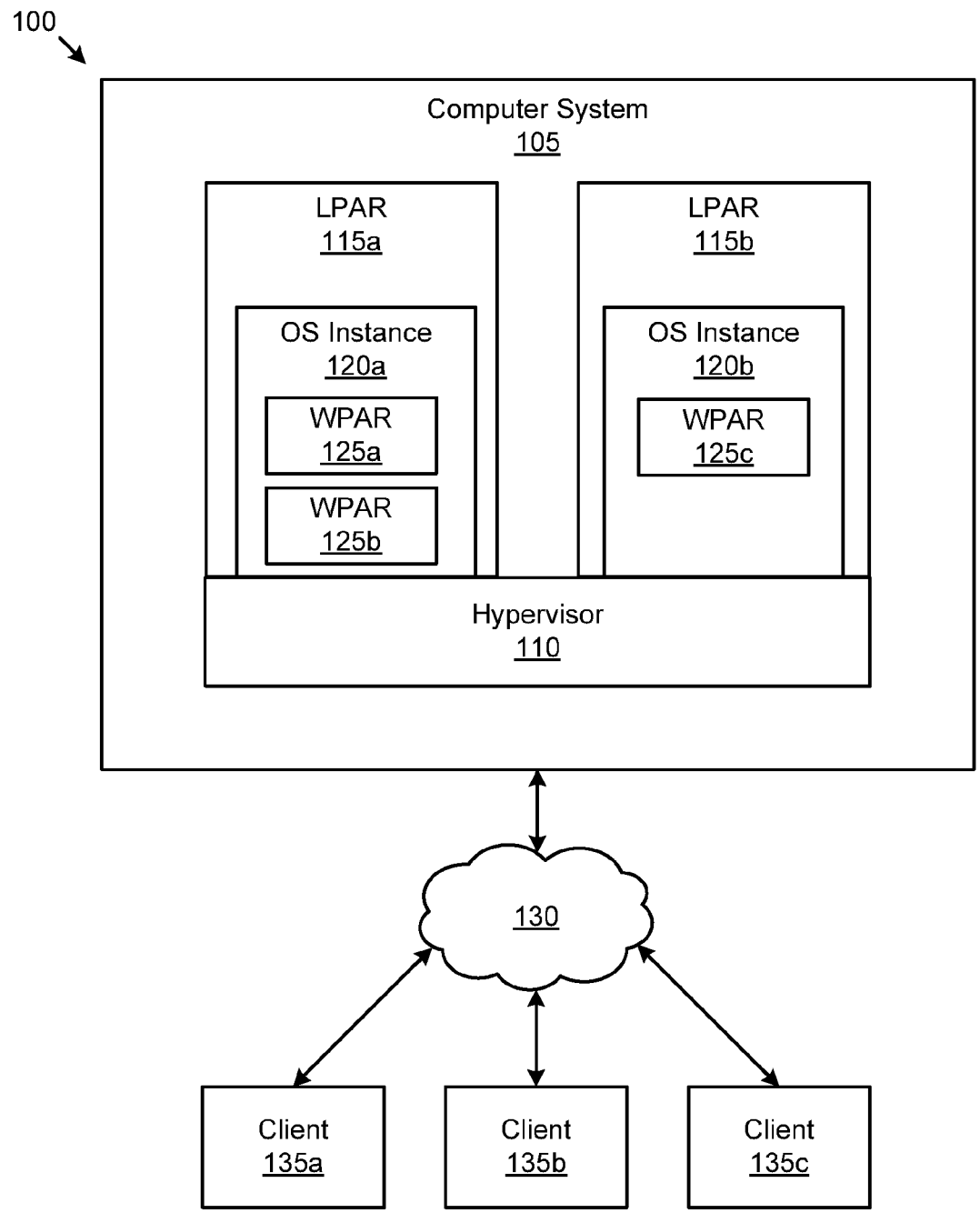
FIG. 1 is a schematic block diagram illustrating one embodiment of a system for relocating resource partitions in accordance with the present invention.

References throughout this specification to features, advantages, or similar language do not imply that all of the features and advantages may be realized in any single embodiment. Rather, language referring to the features and advantages is understood to mean that a specific feature, advantage, or characteristic is included in at least one embodiment. Thus, discussion of the features and advantages, and similar language, throughout this specification may, but do not necessarily, refer to the same embodiment.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of computer readable program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the computer readable program code may be stored and/or propagated on in one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireline, optical fiber, Radio Frequency (RF), or the like, or any suitable combination of the foregoing In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++, PHP or the like and conventional procedural programming languages, such as the "C" programming language or similar programming languages. The computer readable program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by computer readable program code. The computer readable program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The computer readable program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The computer readable program code may also be loaded onto a computer, other programmable data processing apparatus, or other devices to cause a series of operational steps to be performed on the computer, other programmable apparatus or other devices to produce a computer implemented process such that the program code which executed on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer readable program code.

FIG. 1 is a schematic block diagram illustrating one embodiment of a system 100 for relocating resource partitions. In the depicted embodiment, the system 100 includes a computer system 105 with a hypervisor 110 providing first and second logical partitions (LPARs) 115*a,b*, each LPAR 115*a,b* including an operating system (OS) instance 120*a,b* (e.g. a first OS instance 120*a* and a second OS instance 120*b*). The first OS instance 120*a* includes first and second workload partitions (WPARs) 125*a,b* and the second OS instance 120*b* includes a third WPAR 125c. The computer system 105 is in communication with one or more clients 135a, 135b, 135c, through a network 130.

The computer system 105 may include a processor and a memory that stores computer readable programs. The memory may be embodied by volatile memory such as dynamic random access memory ("DRAM"), static random access memory ("SRAM"), or other suitable volatile memory. The processor executes the computer readable programs as is well known to those skilled in the art. The computer readable programs may be tangibly stored in storage in the computer system 105. The storage may include a Solid State Drive ("SSD"), a hard disk drive ("HDD"), an optical storage device, a holographic storage device, a micromechanical storage device, or other non-volatile data storage device. The computer system 105 may be embodied by a server computer, a desktop computer, a laptop computer, a tablet computer, a mobile device, or another device. In one embodiment, the computer system 105 is an International Business Machines (IBM®) computer system such as, but not limited to, a System Z® or Power Systems® computer. As used herein, in certain embodiments, the term "division" refers to a computer system 105.

The hypervisor 110 (also known as a virtual machine monitor) includes software and/or hardware to provide and/or host one or more virtual machines. As is known in the art, a virtual machine abstracts actual hardware characteristics of the computer system 105, providing a virtual representation of computing resources for use by a virtual guest such as an operating system. The virtual guest executes in the virtual machine as if it were running directly on the computer system 105 except that the hypervisor 110 manages execution of the virtual guest and may restrict access to various system resources. The hypervisor 110 may provide a portion of resources of the underlying computer system 105 to each virtual guest such as a subset of computer system 105 instruction set of the underlying machine, kernel calls, hardware registers, and the like. The hypervisor 110, in on embodiment, is an LPAR hypervisor from IBM®, a Processor Resource/System Manager (PR/SM™) hypervisor from IBM®, a POWER Hypervisor™ from IBM®, or other suitable hypervisor 110 capable of supporting LPARs.

In the depicted embodiment, the hypervisor 110 provides and/or hosts a first LPAR 115a and a second LPAR 115b. Although FIG. 1 depicts two LPARs 115a,b, the computer system 105 may be partitioned into any suitable number of LPARs 115a,b. An LPAR 115a,b is a type of virtual machine, comprising a logical subset of the computer system's 105 hardware resources, virtualized as a separate computer. The hypervisor 110 may partition the computer system 105 into multiple LPARs 115a,b, as depicted, each LPAR 115a,b hosting a separate OS instance 120a,b. Each LPAR provides a distinct operating environment in which an OS instance 120, a,b may execute.

Furthermore, each LPAR 115a,b may access different address ranges from a common memory chip. A processor may be dedicated to a particular LPAR 115a,b or may be shared among LPARs 115a,b. In one embodiment, the first and second LPARs 115a,b are logical partitions provided by IBM® software and/or hardware on IBM® computers and servers such as, but not limited to, System z® or Power Systems® servers and computers and/or operating systems such as z/OS, z/VM, z/VSE, z/TPF, AIX, Linux, and i5/OS. As used herein, in certain embodiments, the terms "resource partition" refer to an LPAR 115a,b. In certain embodiments, the term "division" refers to an LPAR 115a,b.

Each OS instance 120a,b may include an executing operating system, with an operating system kernel, that assumes it is communicating directly with hardware of the computer system 105. For example, a first OS instance 120a may maintain a page table that stores a mapping between physical addresses on memory and logical addresses received by a processor from a client such as an application. The first OS instance 120a may assume that the physical addresses in its page table are actual physical addresses on memory and that the first OS instance 120a actually communicates with the processor and other hardware data structures of the computer system 105. However, instead of the processor, the first OS instance 120a may actually be communicating with the hypervisor 110 and the supposed physical addresses are treated as virtual addresses by the hypervisor 110, which performs another layer of mapping to map each supposed physical address to an actual physical address of the computer system memory. In one embodiment, the first and second OS instances 120a,b each comprise instances of the Advanced Interactive eXecutive ("AIX") operating system from IBM®.

As depicted, a first WPAR 125a and a second WPAR 125b execute in the first OS instance and a third WPAR 125c executes in the second OS instance 120b, although each OS instance 120a,b may execute any suitable number of WPARs 125a-c. While LPARs 115a,b allow virtual partitioning of the computer system 105, WPARs 125a-c allow partitioning of an operating system instance 120a. A WPAR 125a is a software partition that is created from and hosted by, an OS instance 120a and shares resources of the OS instance 120a among other WPARs 125b. Each WPAR 125a-c is a virtualized operating system environment that is created within a single OS instance 120a,b. Each WPAR 125a-c provides application environment isolation and operating system level virtualization. In one embodiment, the WPARs 125a-c are software partitions of an AIX operating system instance. As used herein, in certain embodiments, the terms "resource partition" refer to a WPAR 125a-c.

The network 130 may comprise a communications network such as the Internet, a Local Area Network ("LAN"), a Wireless LAN ("WLAN"), multiple LANs communicating over the Internet, or any other similar communications network. Each client 135a, 135b, 135c communicates with the computer system 105 through the network 130. For example, a client 135a may access a particular application executing in the first WPAR 125a of the first OS instance 120a. In one embodiment, a client 135a may be embodied as a desktop computer, a portable computer, a server, a mainframe computer, a handheld computing device, a touch device, a PDA, a tablet computer, an e-Book reader, a mobile phone, a Smartphone, and the like.

Figure 2:
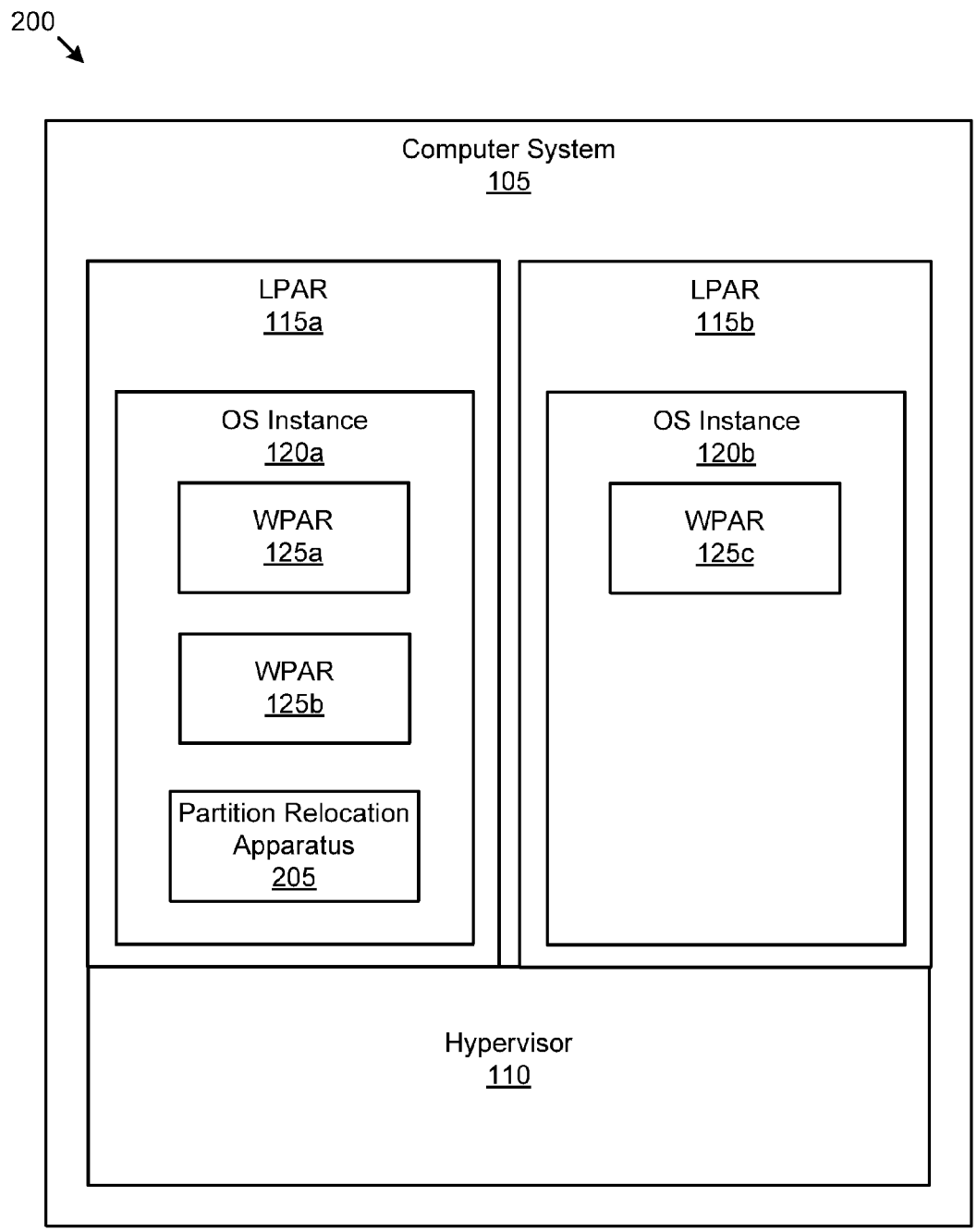
FIG. 2 is a schematic block diagram illustrating another embodiment of a system for relocating resource partitions in accordance with the present invention.

FIG. 2 is a schematic block diagram illustrating another embodiment of a system 200 for relocating resource partitions. Specifically, FIG. 2 depicts one embodiment of the computer system 105, hypervisor 110, and a first and second LPAR 115a,b, each with an OS instance (first and second OS instances 120a,b in the first and second LPARs 115a,b respectively), which may be substantially similar to the like named elements in FIG. 1. Likewise, the first OS instance 120a includes first and second WPARs 125a,b and the second OS instance 120b includes a third WPAR 125c, which may also be substantially similar to the like-named elements in FIG. 1.

In certain embodiments, WPARs 125a-c may communicate with one another. For example, the first WPAR 125a may communicate with the second WPAR 125b (e.g. an application running on the first WPAR 125a may communicate with an application running on the second WPAR 125b). In one embodiment, WPARs 125a,b that execute in a common LPAR 115a may communicate with one another through a loop-back interface, resulting in better optimization of network bandwidth. A loopback interface is a virtual network interface, implemented in software, which allows for more efficient communication because data does not have to be transmitted over a physical communication adapter. Traffic send to the loopback interface is often immediately received on the same interface. Therefore, communication between the first WPAR 125a and the second WPAR 125b is typically more efficient than communication between the first or second WPARs 125a,b and the third WPAR 125c.

Likewise, in certain embodiments, LPARs 115a,b may communicate with one another. For example, the first LPAR 115a may communicate with the second LPAR 115b (e.g. applications running on the first LPAR 115a may communicate with applications running on the second LPAR 115b). In one embodiment, LPARs 115a,b that execute on a common computer system 105 may communicate with one another through a common virtual Ethernet connection, resulting in better optimization of network bandwidth. Virtual Ethernet allows LPARs 115a,b in a common computer system 105 to communicate with each other without having to communicate through physical hardware. Therefore, communication between the first LPAR 115a and the second LPAR 115b is typically more efficient than communication between the first or second LPARs 115a,b and an LPAR on another computer system 105.

Many conventional hypervisors 110 and computer systems 105 (configured for virtualization) support virtual machine/ virtual guest migration in which a virtual machine or virtual guest is moved from one location to another (e.g. to another computer system or to another partition on a computer system). Similarly, in one embodiment, the hypervisor 110 and/ or computer system 105 is configured to perform live partition mobility ("LPM"), which involves relocating an executing LPAR 115a and/or WPAR 125a (e.g. copying a particular WPAR 125a and its executing workload from a first location to a second location).

In one embodiment, the hypervisor 110 relocates an LPAR 115a from a first computer system 105 to a second computer system 105. In one embodiment, the hypervisor 110 relocates a WPAR 125a from a first LPAR 115a to a second LPAR 115b. The hypervisor 110 may implement policy-based relocation of a WPAR 125a or an LPAR 115a in response to various triggers. For example, the hypervisor 110 may relocate a particular LPAR 115a if storage space on the particular LPAR's 115a host computer system 105 drops below a minimum threshold. The hypervisor 110 may relocate a particular WPAR 125a if the hosting LPAR's 115a resource usage exceeds predetermined criteria. Other suitable triggers and relocation criteria may be apparent to one of ordinary skill in the art. Furthermore, in some embodiments, a user may also initiate WPAR/LPAR relocation in certain instances such as before a hardware or software upgrade or a planned outage.

However, convention hypervisors 110 do not take into account inter-WPAR or inter-LPAR communication when relocating an LPAR 115a or a WPAR 125a. Therefore, the hypervisor 110 may initiate a relocation event to relocate a particular LPAR 115a or a particular WPAR 125a that communicates heavily with other LPARs 115b or WPARs 125b. If the particular LPAR 115A is relocated to another computer system 105 or if the particular WPAR 125a is relocated to another LPAR 115b, communication efficiency may decrease if the relocated WPAR 125a or LPAR 115a maintains significant communication with WPARs 125b or LPARs 115b now without the benefit of the loopback interface or virtual Ethernet. For example, if the first WPAR 125a communicates significantly with the second WPAR 125b and the first WPAR 125a is relocated from the first LPAR 115a to the second LPAR 115b, subsequent communication between the first and second WPARs 125a,b will utilize more bandwidth.

Therefore, the system 200 includes a partition relocation apparatus 205 that detects a relocation event (e.g. triggered by the hypervisor 110) to relocate a resource partition (e.g. an LPAR 115a,b or a WPAR 125a-c). The partition relocation apparatus 205 may determine whether any other resource partitions located in the same division (e.g. an LPAR 115a if a WPAR 125a is being relocated, and a computer system 105 if an LPAR 115a is being relocated) are sufficiently related. The partition relocation apparatus 205 may then relocate, or cause to be relocated, any related resource partitions so that communication between the relocated resource partition and any significantly related resource partitions can take advantage of the loopback interface or virtual Ethernet.

In the depicted embodiment, the partition relocation apparatus 205 resides and/or executes in the first OS instance 120a. In certain embodiments, the partition relocation apparatus 205 resides and/or executes in an OS instance 120a,b associated with the resource partition that is the target of the relocation event (e.g. the resource partition being relocated by the hypervisor 110). In some embodiments, a copy and/or a portion of the partition relocation apparatus 205 resides in and/or executes in multiple OS instances (e.g. the first OS instance 120a may include a first copy of a partition relocation apparatus 205 for its LPAR 115a and WPARs 125a,b and the second OS instance 120b may include a second copy of a partition relocation apparatus 205 for its LPAR 115b and WPARs 125c).

While the depicted partition relocation apparatus 205 resides in the first OS instance 120a, the partition relocation apparatus 205 may be in communication with first OS instance 120a (e.g. an operating system kernel of the first OS instance 120a), whether or not the partition relocation apparatus 205 is integrated with the first OS instance 120a (e.g. the partition relocation apparatus 205 is part of the operating system code) or is embodied as a separate application from the first OS instance 120a, such as a plug-in to the first OS instance 120a. In other embodiments, at least a portion of the partition relocation apparatus 205 resides and/or executes in the hypervisor 110 and may be integrated with the hypervisor 110. In one embodiment, the partition relocation apparatus 205 is a plug-in to the hypervisor 110.

Figure 3A:
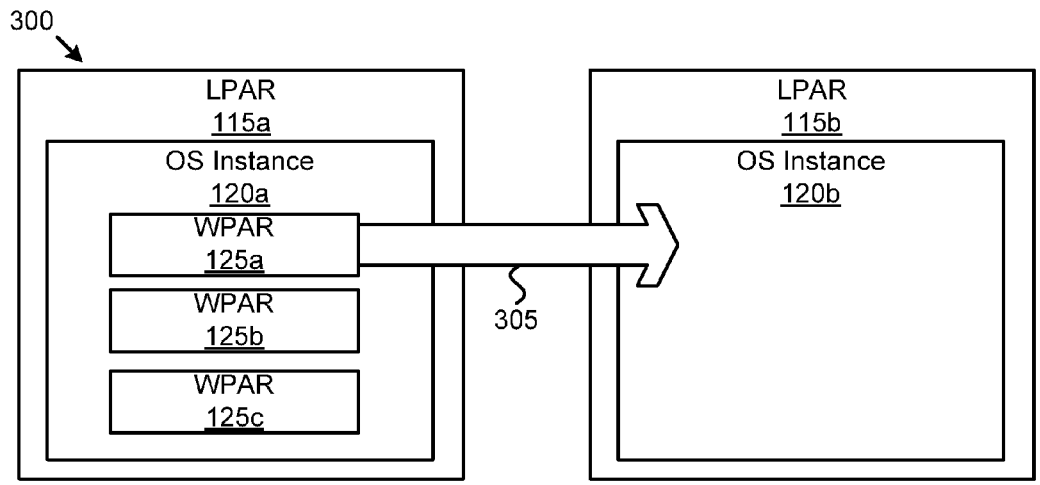
FIG. 3A is a schematic block diagram illustrating one embodiment of a WPAR relocation event in accordance with the present invention.
Figure 3B:
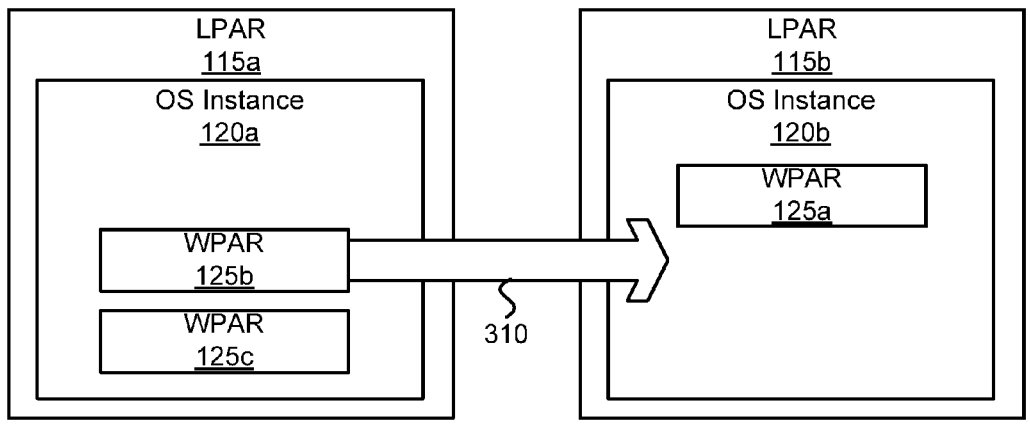
FIG. 3B is a schematic block diagram illustrating one embodiment of relocating a related WPAR in accordance with the present invention.
Figure 3C:
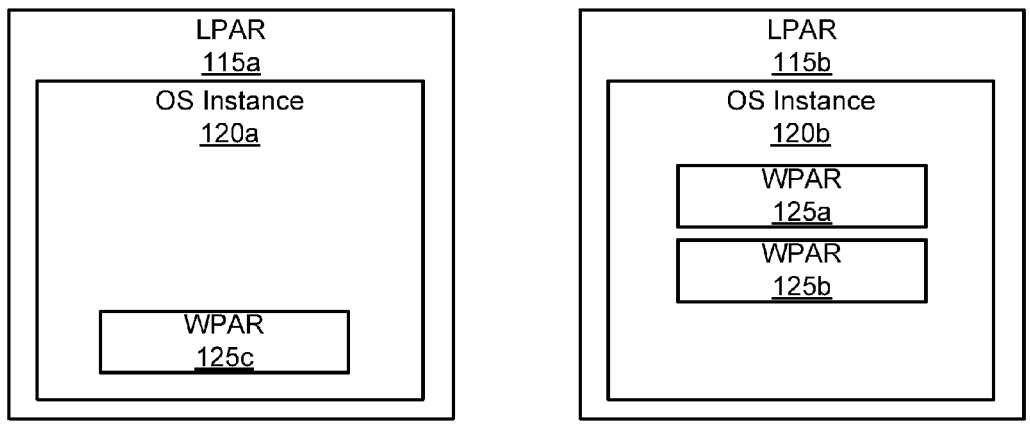
FIG. 3C is a schematic block diagram illustrating one embodiment of a relocated related WPAR in accordance with the present invention.

FIGS. 3A-C depict an example embodiment of resource partition relocation. Referring to FIG. 3A, the hypervisor 110 may initiate a relocation event to relocate a first WPAR 125a from a first LPAR 115a to a second LPAR 115b. The partition relocation apparatus 205 detects the relocation event and determines whether any other WPARs 125b are sufficiently related to the first WPAR 125a. Referring to FIG. 3B, the partition relocation apparatus 205 determines that the second WPAR 125b is sufficiently related to the first WPAR 125a and the partition relocation apparatus 205 determines that the second WPAR 125b should also be relocated to the second LPAR 115b. The partition relocation apparatus 205 then relocates and/or causes to be relocated (e.g. by signaling the hypervisor 110 to carry out the relocation) the second WPAR 125b. Note that, as described below, in on embodiment, a WPAR 125a that is the subject of a relocation event may be relocated first, and then other related WPARs 125b may be subsequently relocated. In another embodiment, the WPAR 125a that is the subject of the relocation event may be relocated along with any related WPARs 125b. FIG. 3C depicts the second WPAR 125b relocated onto the second LPAR 115*b* where the second WPAR 125*b* and the first WPAR 125*a* may communicate efficiently with the loopback interface.

Figure 4A:
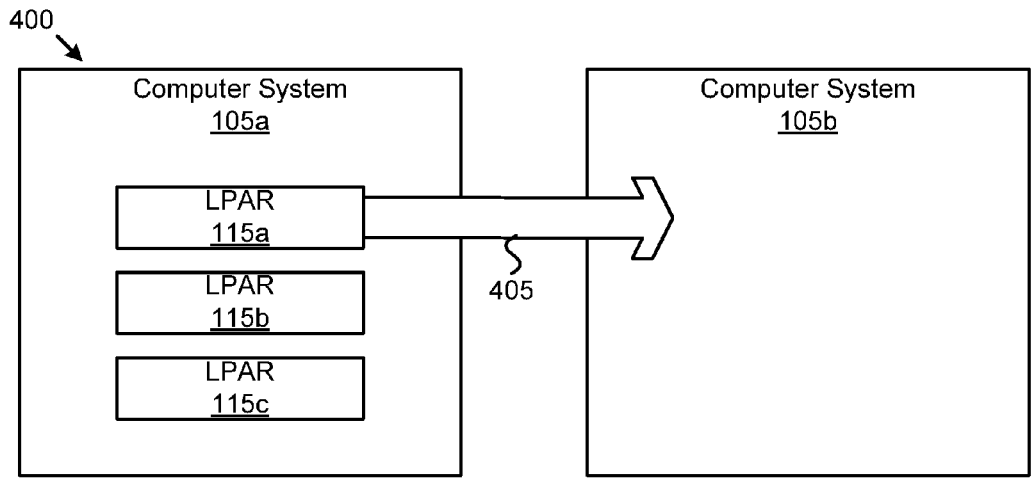
FIG. 4A is a schematic block diagram illustrating one embodiment of a LPAR relocation event in accordance with the present invention.
Figure 4B:
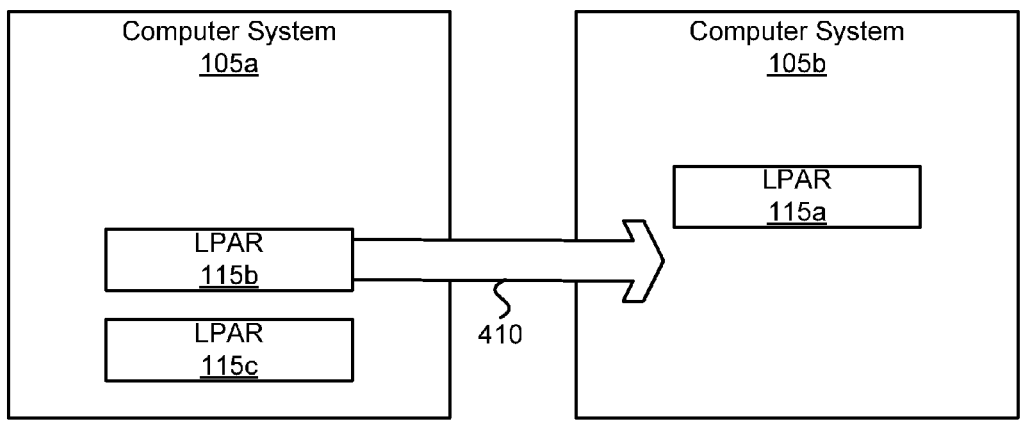
FIG. 4B is a schematic block diagram illustrating one embodiment of relocating a related LPAR in accordance with the present invention.
Figure 4C:
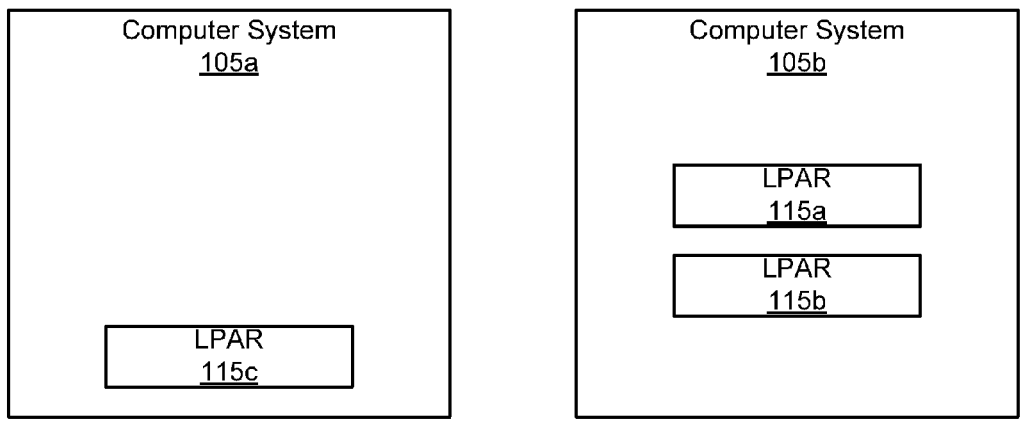
FIG. 4C is a schematic block diagram illustrating one embodiment of a relocated related LPAR in accordance with the present invention.

FIGS. 4A-C depict another example embodiment of resource partition relocation. Referring to FIG. 4A, the hypervisor 110 may initiate a relocation event to relocate a first LPAR 115*a* from a first computer system 105*a* to a second computer system 105*b*. The partition relocation apparatus 205 detects the relocation event and determines whether any other LPARs 115*b,c* are sufficiently related to the first LPAR 115*a*. Referring to FIG. 4B, the partition relocation apparatus 205 determines that the second LPAR 115*b* is sufficiently related to the first LPAR 115*a* and the partition relocation apparatus 205 determines that the second LPAR 115*b* should also be relocated to the second computer system 105*b*. The partition relocation apparatus 205 then relocates and/or causes to be relocated (e.g. by signaling the hypervisor 110 to carry out the relocation) the second LPAR 115*b*. Note that, as described below, in one embodiment, an LPAR 115*a* that is the subject of a relocation event may be relocated first, and then other related LPARs 115*b* may be subsequently relocated. In another embodiment, the LPAR 115*a* that is the subject of the relocation event may be relocated along with any related LPARs 115*b*. FIG. 4C depicts the second LPAR 115*b* relocated onto the second computer system 105*b* where the second LPAR 115*b* and the first LPAR 115*a* may communicate efficiently through a virtual Ethernet on the second computer system 105*b*.

Figure 5:
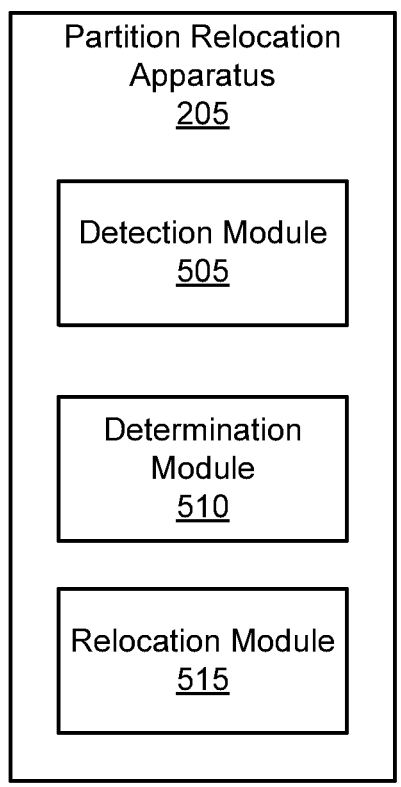
FIG. 5 is a schematic block diagram illustrating one embodiment of a partition relocation apparatus in accordance with the present invention.

FIG. 5 is a schematic block diagram illustrating one embodiment of a partition relocation apparatus 205. The partition relocation apparatus 205 may be one embodiment of the partition relocation apparatus 205 of FIG. 3 and includes one or more of a detection module 505, a determination module 510, and a relocation module 515.

The detection module 505, in one embodiment, detects a relocation event to relocate a resource partition. The relocation event, in one embodiment, is initiated by a hypervisor 110 managing the resource partition. Specifically, the detection module 505 may detect a relocation event to relocate a first resource partition operating in a first division from the first division to a second division. The first division includes one or more second resource partitions (resource partitions that are not the target of the relocation event).

The first resource partition and the second resource partitions, in one embodiment, are each distinct operating environments. In one embodiment, the first resource partition and the second resource partitions are each a WPAR 125*a,b* and the first division and the second division are each an LPAR 115*a,b*. In another embodiment, the first resource partition and the second resource partitions are each an LPAR 115*a,b* and the first division and the second division are each a distinct computer system 105*a,b*. In other embodiments, the first and second resource partitions are virtual machines, virtual guests, or other suitable virtual computing environments.

The determination module 510, in one embodiment, determines whether any of the second resource partitions (e.g. the second LPAR 115*b* or the second WPAR 125*b*) are sufficiently related to the first resource partition (e.g. the first LPAR 115*a* or the first WPAR 125*a*). In one embodiment, relatedness is based on an amount of communication traffic between the first resource partition and one or more of the second resource partitions. In a further embodiment, the determination module 510 determining that the second resource partition is sufficiently related to the first resource partition includes the determination module 510 determining that communication traffic between the first resource partition and the second resource partition meets a predetermined threshold. In one embodiment, communication traffic comprises bandwidth utilization.

The determination module 510 may iterate through second resource partitions, determining whether each selected second resource partitions is sufficiently related to the first resource partition. Therefore, in one embodiment, the determination module 510 determines that a second resource partition is sufficiently related to the first resource partition and then may also determine that a third resource partition is sufficiently related to the first resource partition.

In one embodiment, the determination module 510 determines whether each of the second resource partitions is sufficiently related to the first resource partition in order of relatedness. As described below, the second resource partitions may be sorted in order of relatedness. The determination module 510 may determine whether second resource partitions are sufficiently related in this sorted order. Therefore, as storage space and/or other resources on the second division may be an issue, the determination module 510 may determine relatedness of the most related resource partitions first so as to facilitate relocating the most related resource partitions in the available space on the second division.

In one embodiment, resource partitions may be designated as being related. For example, a user may designate the second resource partition as being related to the first resource partition. As a result, if the first resource partition is the target of a relocation event, the determination module 510 would determine that the second resource partition is sufficiently related to the first resource partition because of the pre-defined relationship.

The relocation module 515, in one embodiment, relocates a second resource partition (e.g. the second LPAR 115*b* or the second WPAR 125*b*) to the second division (e.g. the second LPAR 115*b* or the second computer system 105*b*) with the first resource partition in response to the determination module 510 determining that the second resource partition is sufficiently related to the first resource partition. The relocation module 515 may directly or indirectly relocate the second resource partition. In one embodiment, the relocation module 515 relocates a second resource partition by signaling to the hypervisor 110 to initiate the relocation. In another embodiment, the relocation module 515 performs the relocation.

Furthermore, in one embodiment, relocating the second resource partition to the second division with the first resource partition includes relocating the second resource partition (and any other second resource partitions determined to be sufficiently related) along with and/or at substantially the same time as the first resource partition. In one embodiment, relocating the second resource partition to the second division with the first resource partition includes relocating the second resource partition (and any other second resource partitions determined to be sufficiently related) to be with the first resource partition (e.g. on the second division), not necessarily at substantially the same time or along with the first resource partition.

In one embodiment, the relocation module 515 relocates any second resource partitions that the determination module 510 determines are sufficiently related to the first resource partition and the determination module 510 does not make any more determinations related to the first resource partition. In certain embodiments, the relocation module 515 relocates a single second resource partition determined by the determination module 510 to be sufficiently related to the first resource partition. Then, the determination module 510 may re-evaluate relatedness (as assigned relatedness rankings may change with the relocation) between the remaining second resource partitions and the first resource partition as described below.

In one embodiment, the relocation module 515 relocates the second resource partition if it is both sufficiently related and if sufficient resources exist on the second division. Therefore, the relocation module 515 may relocate the second resource partition to the second division with the first resource partition in response to both a determination that the second division comprises sufficient resources and the determination module 510 determining that the second resource partition is sufficiently related to the first resource partition.

As described above, in one embodiment, the first division includes two or more second resource partitions (resource partitions not targeted in the relocation event) and the relocation module 515 relocates resource partitions of the two or more second resource partitions that are sufficiently related to the first resource partition. Therefore, the relocation module 515 may relocate multiple second resource partitions.

As described above the relocation module 515 may continue to relocate resource partitions that are sufficiently related if the second division includes sufficient resources such as storage space. Continuing the example above, if the relocation module 515 relocated the second resource partition and the determination module 510 determined that a third resource partition was sufficiently related to the first resource partition, the relocation module 515 may relocate the third resource partition to the second division with the first resource partition. In one embodiment, the relocation module 515 continues relocating sufficiently related resource partitions as long as resources are available in the second division. Therefore, the relocation module 515, in one embodiment, relocates the third resource partition in response to both the determination module 510 determining that the third resource partition is sufficiently related to the first resource partition and determining that the second division has sufficient resources for relocation of the third resource partition.

Figure 6:
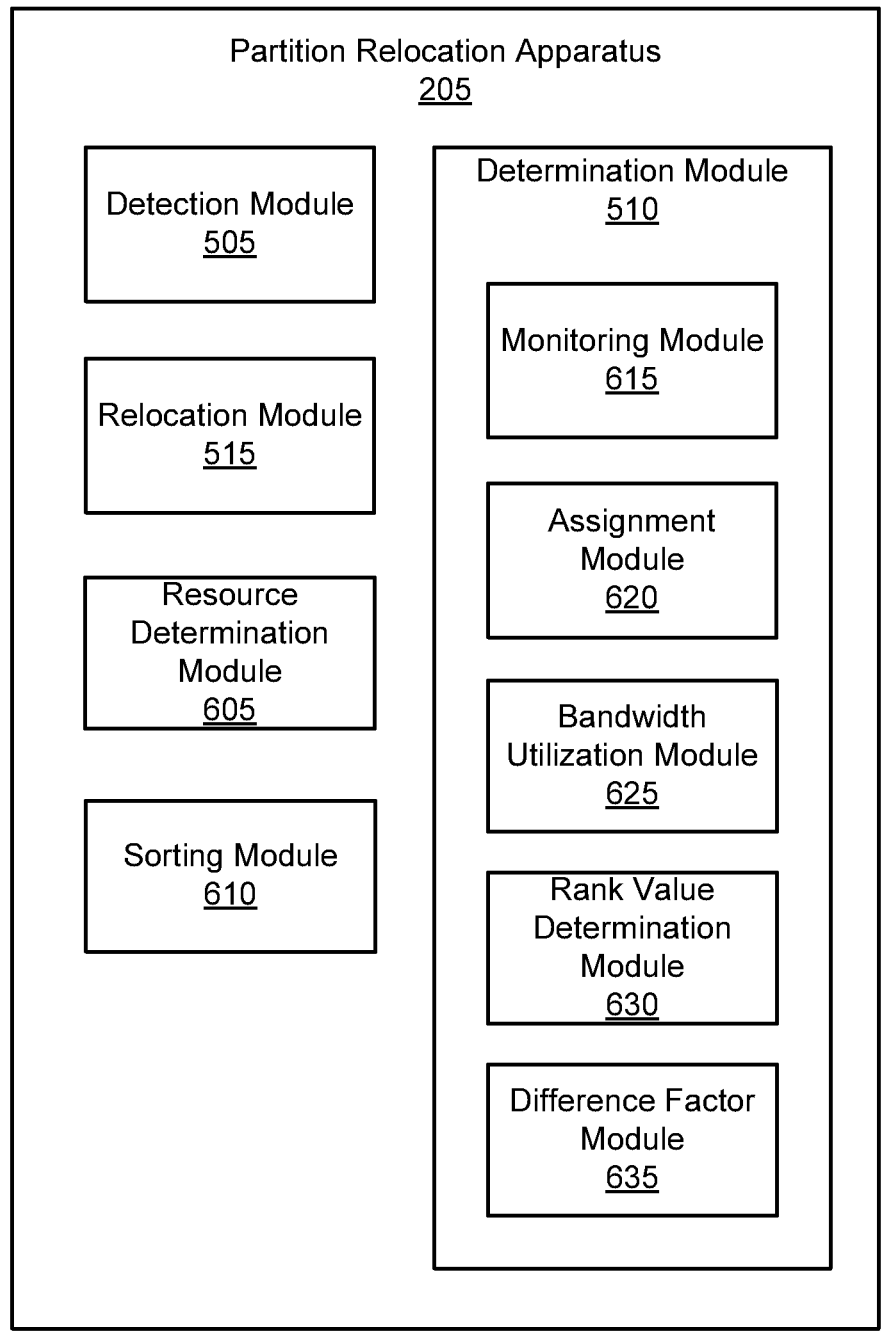
FIG. 6 is a schematic block diagram illustrating another embodiment of a partition relocation apparatus in accordance with the present invention.

FIG. 6 is a detailed schematic block diagram illustrating another embodiment of a partition relocation apparatus 205. In the depicted embodiment, the partition relocation apparatus 205 includes the detection module 505, the determination module 510, and the relocation module 515, which are substantially similar to those described in relation to FIG. 5. In the depicted embodiment, the partition relocation apparatus 205 further includes one or more of a resource determination module 605 and a sorting module 610 and the determination module 510 includes one or more of a monitoring module 615, an assignment module 620, a bandwidth utilization module 625, a rank value determination module 630, and a difference factor module 635, which are described below.

The resource determination module 605, in one embodiment, determines whether the second division comprises sufficient resources for relocation of second resource partitions. In one embodiment, the relocation module 515 relocates the second resource partition to the second division with the first resource partition in response to the resource determination module 605 determining that the second division comprises sufficient resources and the determination module 510 determining that the second resource partition is sufficiently related to the first resource partition.

The sorting module 610, in one embodiment, sorts the two or more second resource partitions in order of relatedness between the first resource partition and the two or more second resource partitions. In one embodiment, relatedness is based on an amount of communication traffic between the first resource partition and each of the two or more second resource partitions. In one embodiment, the sorting module 610 sorts the second resource partitions in order of assigned rank value (based on communication traffic between each second resource partition and the first resource partition) as described below. In one embodiment, the determination module 510 determines whether the two or more second resource partitions are sufficiently related to the first resource partition in order of the relatedness. In one embodiment, the sorting module 610 stores and sorts the second resource partitions (e.g. identifiers for or pointers to the second resource partitions) in a data structure such as an array or a list.

The monitoring module 615 monitors communication traffic between the first resource partition and the second resource partitions in the same division as the first resource partition. For example, the monitoring module 615 may monitor the amount of data transmitted between the first resource partition and the second resource partitions (e.g. the monitoring module 615 may record the amount of data received in a first WPAR 125a from a second WPAR 125b and may record the amount of data sent to the second WPAR 125b from the first WPAR 125a).

The assignment module 620, in one embodiment, assigns each of the second resource partitions a rank value. In one embodiment, the assignment module 620 assigns each second resource partition a rank value based on communication traffic with each other resource partition in a common division. For example, the assignment module 620 may assign a first WPAR 125a a particular rank based on its communication with a second and third WPARs 125b,c in the first division 115a.

In one embodiment, the assignment module 620 maintains resource partition rank values in a communication traffic table. For example, assuming that the first division includes five resource partitions X, A, B, C, and D in a first division (LPARs 115a,b in a computer system 105a or WPARs 125a,b in an LPAR 115a). An example embodiment of the communication traffic table may be as follows:

TABLE 1

|   | X | A | B | C | D |
|---|---|---|---|---|---|
| X | — | 8 | 10 | 0 | 0 |
| A | 8 | — | 3 | 8 | 8 |
| B | 10 | 1 | — | 1 | 2 |
| C | 0 | 8 | 1 | — | 3 |
| D | 0 | 8 | 2 | 3 | — |

The assignment module 620 may assign the highest communicating resource partition a highest rank (10 in the given example) and assign other resource partitions relative ranks.

The bandwidth utilization module 625, in one embodiment, as part of determining whether any resource partitions are sufficiently related to a first resource partition (a resource partition the subject of a relocation event), calculates an effective bandwidth utilization (EBU) for each second resource partition (resource partitions in the division that are not the target of a relocation event). The EBU, in one embodiment, includes a sum of rank values for a particular second resource partition. Specifically, assuming that the array "parlist" includes each resource partition besides the first resource partition, EBU may be calculated according to the following equation: EBU parlist[i]=((communication traffic between parlist[i] and parlist[i+1])+(communication traffic between parlist[i] and parlist[i+2]) . . . ).

In one embodiment, the bandwidth utilization module 625 calculates the EBU for second resource partitions in sorted order (starting with the highest ranked resource partition). Continuing the example above, the bandwidth utilization module 625 may determine the EBU for resource partitions A-D as follows: EBU of B=4 (1+1+2), EBU of A=19(3+8+8), EBU of C=12 (8+1+3), and EBU of D=13 (8+2+3).

The rank value determination module 630, in one embodiment, determines whether rank values for each second resource partition are greater than the EBU for those resource partitions. Specifically, the rank value determination module 630 determines whether a rank value for communication traffic between a particular second resource partition and the first resource partition is greater than the EBU for the particular second resource partition. Continuing the above example, with resource partition B, the rank value determination module 630 would determine that the rank value for communication between X and B, 10, is greater than the EBU of B, which is 4. The rank value determination module 630 may iterate through the array of resource partitions in sorted order making a determination for each resource partition.

For resource partitions whose rank values are greater than their EBUs, the difference factor module 635, in one embodiment, calculates a difference factor for a particular second resource partition in response to the rank value determination module 630 determining that the rank value for communication traffic between the particular second resource partition and the first resource partition is greater than the EBU. In one embodiment, the difference factor is an anticipated amount of reduced communication traffic if the particular second resource partition is relocated with the first resource partition.

Continuing with the above example, the difference factor module 635 would first determine that if B is not relocated with X, the effective communication traffic between X and the second resource partitions is 18, which is the sum of rank values of the second resource partitions (10+8+0+0). The difference factor module 635 may next determine the effective network traffic if B is relocated along with X by adding the rank values of the other resource partitions (A, C, and D) with the EBU of B, which is 8+4=12. The difference factor module 635 may then compute the difference factor by dividing the difference between the effective communication traffic with B not relocating and the effective communication traffic with B relocating, divided by the effective communication traffic with B not relocating, which is 6/18=33%.

In one embodiment, the difference factor module 635 receives and/or references a predetermined difference factor for comparison with the difference factor computed as described above. The predetermined difference factor may be user determined. In one embodiment, the difference factor module 635 determines whether the computed difference factor is greater than the predetermined difference factor. In one embodiment, the determination module 510 determines that a particular second resource partition is sufficiently related to the first resource partition in response to the difference factor module 635 determining that the difference factor is greater than the predetermined difference factor.

For example, the difference factor module 635 may signal the determination module 510 that the difference factor for a particular second resource partition is greater than the predetermined difference factor and the determination module 510 may determine that the particular second resource partition is sufficiently related to the first resource partition in response to receiving the signal. Continuing with the example, assuming the predetermined difference factor is 30%, the difference factor of B, 33% is greater than 30%. As a result, the relocation module 515 may also relocate B.

Figure 7:
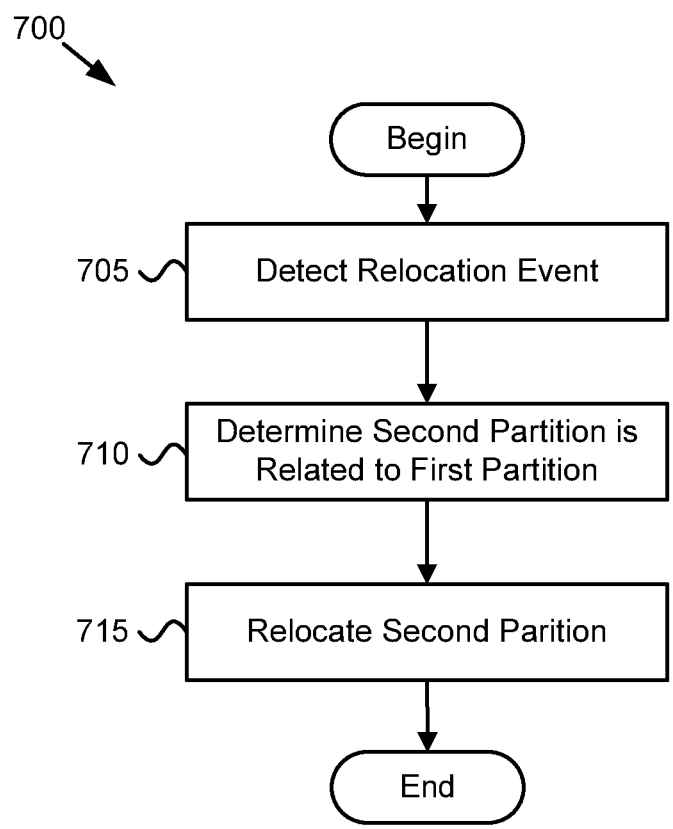
FIG. 7 is a schematic flow chart diagram illustrating one embodiment of a method for relocating resource partitions in accordance with the present invention.

FIG. 7 is a schematic flow chart diagram illustrating one embodiment of a method 700 for relocating resource partitions. The method 700 begins and the detection module 505 detects 705 a relocation event to relocate a first resource partition operating in a first division from the first division to a second division. The first division includes a second resource partition. The first resource partition and the second resource partition are each distinct operating environments. The determination module 510 determines 710 that the second resource partition is sufficiently related to the first resource partition. The relocation module 515 relocates 715 the second resource partition to the second division with the first resource partition, and the method 700 ends.

Figure 8:
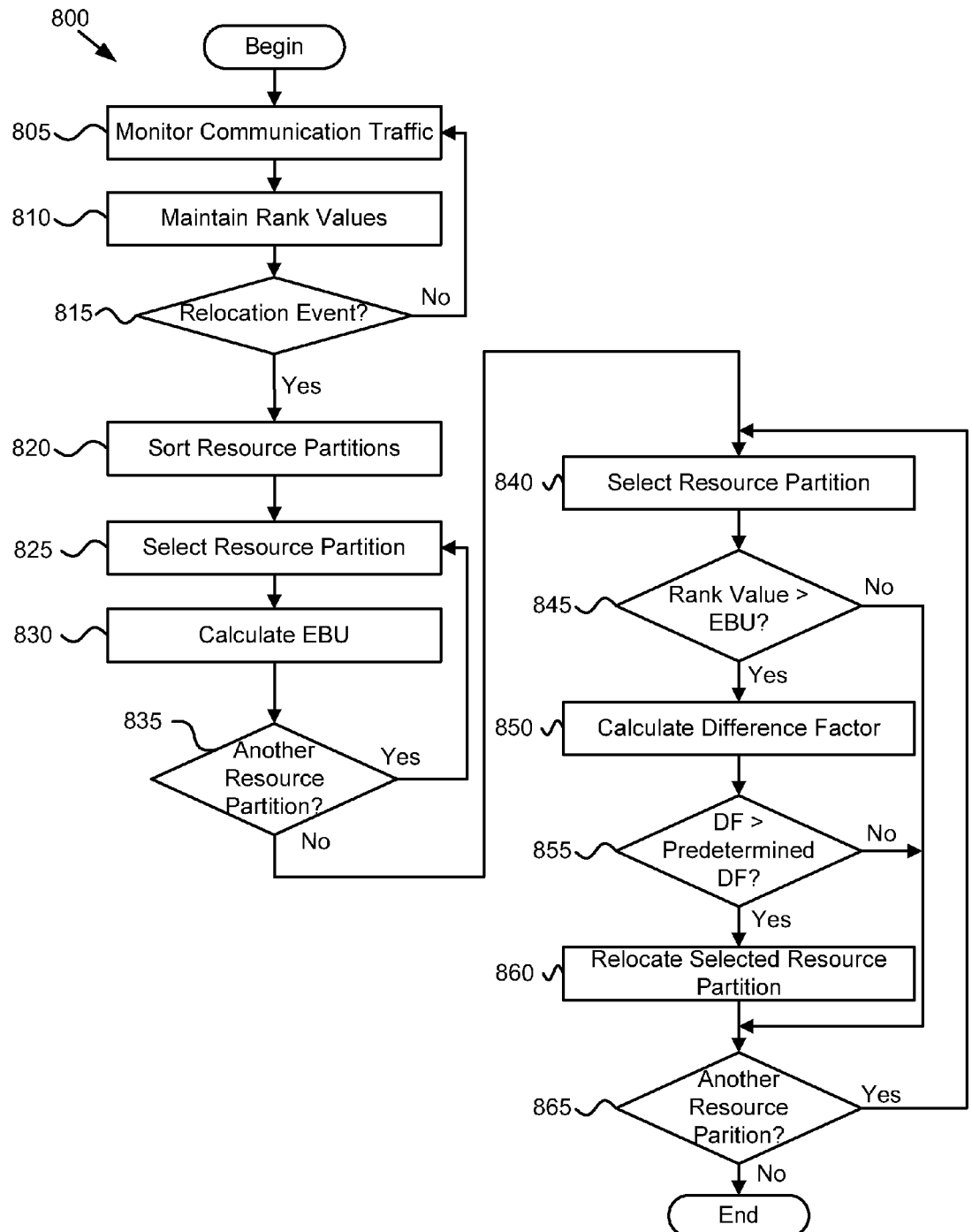
FIG. 8 is a detailed schematic flow chart diagram illustrating another embodiment of a method for relocating resource partitions in accordance with the present invention.

FIG. 8 is a schematic flow chart diagram illustrating another embodiment of a method 800 for relocating resource partitions. The method 800 begins and the monitoring module 615 monitors 805 communication traffic between a first resource partition and two or more second resource partitions operating in a first division. The assignment module 620 assigns and maintains 810 rank values for each of the two or more second resource partitions. The assignment module 620 may assign a rank value to each second resource partition based on communication traffic with each other resource partition. If the detection module 505 does not detect 815 a relocation event to relocate the first resource partition from the first division to a second division, the monitoring module 615 continues to monitor 805 communication traffic.

Alternatively, if the detection module 505 detects 815 a relocation event, the sorting module 610 sorts 820 the two or more second resource partitions in order of communication traffic between the first resource partition and the two or more second resource partitions (e.g. second resource partitions with higher rank values are sorted in order before second resource partitions with lower rank values). The bandwidth utilization module 625 then selects 825 a particular second resource partition (e.g. the next second resource partition in order) and calculates 830 an effective bandwidth utilization for the selected second resource partition. In one embodiment, the effective bandwidth utilization is a sum of rank values for the second resource partition. If the bandwidth utilization module 625 determines 835 that there is another resource partition (e.g. the next resource partition in order), the bandwidth utilization module 625 selects 825 the next resource partition.

Alternatively, if the bandwidth utilization module 625 determines 835 that there are no other second resource partitions, the rank value determination module 630 selects 840 a particular resource partition (e.g. the first resource partition in ranked order) and the rank value determination module 630 determines 845 whether a rank value for communication traffic between the selected second resource partition and the first resource partition is greater than the effective bandwidth utilization (EBU) for the selected second resource partition. If the rank value determination module 630 determines 845 that the rank value between the selected second resource partition and the first resource partition is greater than the effective bandwidth utilization, the difference factor module 635 calculates a difference factor 850 for the selected second resource partition. In one embodiment, the difference factor includes an anticipated amount of reduced communication traffic if the selected second resource partition is relocated with the first resource partition.

Next, if the determination module 510 determines 855 that the difference factor is greater than a predetermined difference factor, the relocation module 515 relocates 860 (designates for relocation) the second resource partition to the second division with the first resource partition. The rank value determination module 630 then determines 865 if there are any other second resource partitions. If the rank value determination module 630 determines 865 that there is another second resource partition, the rank value determination module 630 selects 840 a particular resource partition (e.g. the next resource partition in ranked order). Alternatively, if the rank value determination module 630 determines 865 that there are no other second resource partitions, the method 800 ends.

Returning to the decision in step 845, if the rank value determination module 630 determines 845 that the rank value between the selected second resource partition and the first resource partition is less than the effective bandwidth utilization, the rank value determination module 630 determines 865 whether there are any other second resource partitions (e.g. the rank value determination module 630 moves on to evaluate the next second resource partition). Returning to the decision in step 855, if the determination module 510 determines 855 that the difference factor is less than the predetermined difference factor, the rank value determination module 630 determines 865 whether there are any other second resource partitions (e.g. the rank value determination module 630 moves on to evaluate the next second resource partition).

Figure 9A:
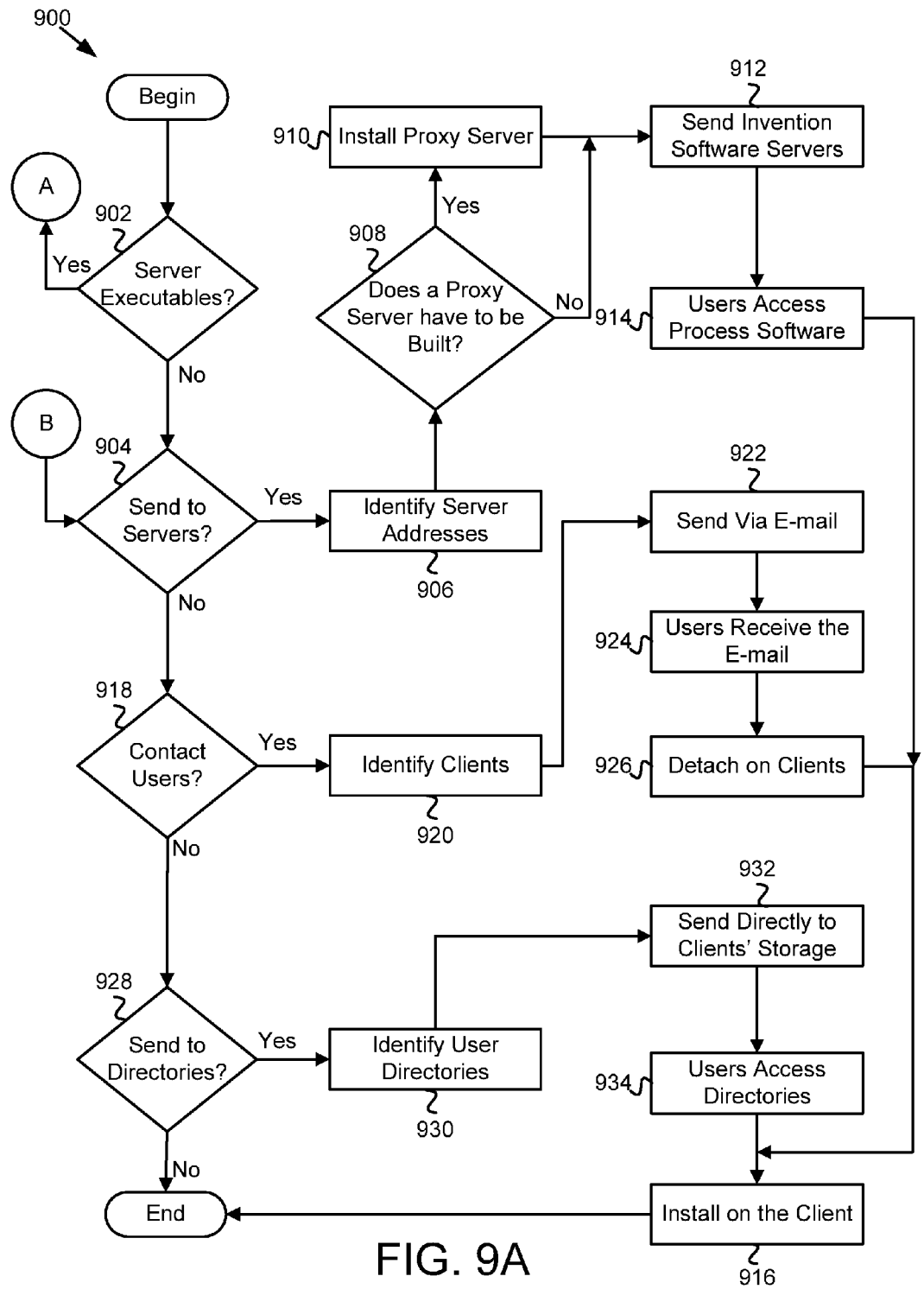
FIG. 9A is a schematic flow chart diagram illustrating one embodiment of a method for deploying a virtual guest security apparatus in accordance with the present invention.

FIG. 9A is a schematic flow chart diagram illustrating one embodiment of a method 900 for deploying a partition relocation apparatus 205. While it is understood that the process software embodying the partition relocation apparatus 205 may be deployed by manually loading directly in the client, server and proxy computers via loading a storage medium such as a CD, DVD, etc., the process software may also be automatically or semi-automatically deployed into a computer system by sending the process software to a central server or a group of central servers. The process software is then downloaded into the client computers that will execute the process software. Alternatively the process software is sent directly to the client system via e-mail. The process software is then either detached to a directory or loaded into a directory by a button on the e-mail that executes a program that detaches the process software into a directory. Another alternative is to send the process software directly to a directory on the client computer hard drive. When there are proxy servers, the process will, select the proxy server code, determine on which computers to place the proxy servers' code, transmit the proxy server code, then install the proxy server code on the proxy computer. The process software may be transmitted to the proxy server and then it may be stored on the proxy server.

Figure 9B:
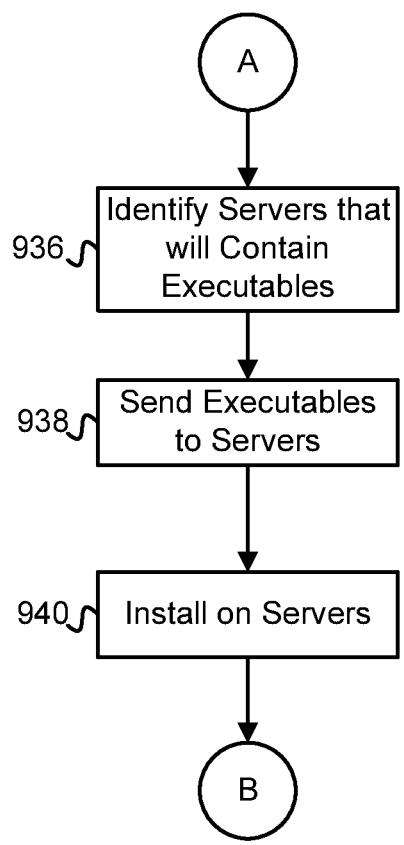
FIG. 9B is a continuation of FIG. 9A illustrating one embodiment of a method for deploying a virtual guest security apparatus in accordance with the present invention.

The method 900 for deployment of the process software begins and a determination 902 is made if there are any programs that will reside on a server or servers when the process software is executed. If this is the case, referring to FIG. 9B, the servers that will contain the executables are identified 936. The process software for the server or servers is transferred 938 directly to the servers' storage via FTP or some other protocol or by copying though the use of a shared file system. The process software is then installed 940 on the servers.

Next, referring back to FIG. 9A, a determination 904 is made on whether the process software is be deployed by having users access the process software on a server or servers. If the users are to access the process software on servers then the server addresses that will store the process software are identified 906. A determination 908 is made if a proxy server is to be built to store the process software. A proxy server is a server that sits between a client application, such as a Web browser, and a real server. It intercepts all requests to the real server to see if it can fulfill the requests itself. If not, it forwards the request to the real server.

The two primary benefits of a proxy server are to improve performance and to filter requests. If a proxy server is required then the proxy server is installed 910. The process software is sent 912 to the servers either via a protocol such as FTP or it is copied directly from the source files to the server files via file sharing. Another embodiment would be to send a transaction to the servers that contained the process software and have the server process the transaction, then receive and copy the process software to the server's file system. Once the process software is stored at the servers, the users, via their client computers, then access 914 the process software on the servers and copy to their client computers file systems. Another embodiment is to have the servers automatically copy the process software to each client and then run the installation program for the process software at each client computer. The user executes the program that installs 916 the process software on his client computer then the method 900 ends.

In step 918, a determination is made whether the process software is to be deployed by sending the process software to users via e-mail. The set of users where the process software will be deployed are identified 920 together with the addresses of the user client computers. The process software is sent via e-mail to each of the users' client computers. The users then receive the e-mail 924 and then detach 926 the process software from the e-mail to a directory on their client computers. The user executes the program that installs 916 the process software on his client computer then the method 900 ends.

Lastly a determination 928 is made on whether to the process software will be sent directly to user directories on their client computers. If so, the user directories are identified 930. The process software is transferred 932 directly to the user's client computer directory. This can be done in several ways such as but not limited to sharing of the file system directories and then copying from the sender's file system to the recipient user's file system or alternatively using a transfer protocol such as File Transfer Protocol (FTP). The users access 934 the directories on their client file systems in preparation for installing the process software. The user executes the program that installs the process software on his client computer 916 then the method 900 ends.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a detection module that detects a relocation event to relocate a first resource partition operating in a first division from the first division to a second division, the first division comprising a second resource partition, the first resource partition and the second resource partition each comprising distinct operating environments;
   a monitor module that monitors communication traffic transmitted between the first resource partition and each of the plurality of second resource partitions;
   an assignment module that assigns a plurality of rank values to each of the plurality of second resource partitions based on an amount of communication traffic transmitted between each of the resource partitions on the first division;
   a bandwidth utilization module that calculates an effective bandwidth utilization for each of the plurality of second resource partitions, wherein the effective bandwidth utilization comprises a sum of rank values for each of the plurality of second resource partitions;

a rank value determination module that determines that a rank value for communication traffic between a second resource partition of the plurality of resource partitions and the first resource partition is greater than the effective bandwidth utilization for the second resource partition;

a difference factor module that calculates a difference factor for the second resource partition, wherein the difference factor indicates an anticipated amount of reduced communication traffic if the second resource partition is relocated with the first resource partition; and a relocation module that relocates the second resource partition to the second division with the first resource partition in response to the determination module determining that the difference factor is greater than a predetermined difference factor.

2. The apparatus of claim 1, further comprising a resource determination module that determines that the second division comprises sufficient resources for relocation of the second resource partition, wherein the relocation module relocates the second resource partition to the second division with the first resource partition in response to the resource determination module determining that the second division comprises sufficient resources and the determination module determining that the second resource partition is related to the first resource partition.

3. The apparatus of claim 1, wherein the first division comprises two or more second resource partitions, the apparatus further comprising a sorting module that sorts the two or more second resource partitions in order of relatedness between the first resource partition and the two or more second resource partitions.

4. The apparatus of claim 3, wherein relatedness is based on an amount of communication traffic between the first resource partition and each of the two or more second resource partitions.

5. A system comprising:
a processor;
a memory in communication with the processor;
an operating system kernel;
a partition relocation apparatus stored on the memory and executed by the processor, the partition relocation apparatus in communication with the operating system kernel, the partition relocation apparatus comprising:
a detection module that detects a relocation event to relocate a first resource partition operating in a first division from the first division to a second division, the first division comprising a second resource partition, the first resource partition and the second resource partition each comprising distinct operating environments;

a determination module that determines that the second resource partition is sufficiently related to the first resource partition; and a monitor module that monitors communication traffic transmitted between the first resource partition and each of the plurality of second resource partitions;

an assignment module that assigns a plurality of rank values to each of the plurality of second resource partitions based on an amount of communication traffic transmitted between each of the resource partitions on the first division;

a bandwidth utilization module that calculates an effective bandwidth utilization for each of the plurality of second resource partitions, wherein the effective bandwidth utilization comprises a sum of rank values for each of the plurality of second resource partitions;

a rank value determination module that determines that a rank value for communication traffic between a second resource partition of the plurality of resource partitions and the first resource partition is greater than the effective bandwidth utilization for the second resource partition;

a difference factor module that calculates a difference factor for the second resource partition, wherein the difference factor indicates an anticipated amount of reduced communication traffic if the second resource partition is relocated with the first resource partition; and a relocation module that relocates the second resource partition to the second division with the first resource partition in response to the determination module determining that the difference factor is greater than a predetermined difference factor determining that the second resource partition is sufficiently related to the first resource partition.

6. The system of claim 5, further comprising a hypervisor that initiates the relocation event to relocate the first resource partition from the first division to the second division.

* * * * *